United States Patent [19]

Lohmann et al.

[11] Patent Number: 5,686,011
[45] Date of Patent: Nov. 11, 1997

[54] PROCESS FOR WATERPROOFING MATERIALS HAVING A FIBROUS STRUCTURE AND AGENTS USED TO CARRY OUT THIS PROCESS

[75] Inventors: Helmut Lohmann, Krefeld; Manfred Kaussen, Aachen; Leonardus Strijbos, Toenisvorst; Waldemar Inger, Krefeld, all of Germany

[73] Assignee: Chemische Fabrik Stockhausen GmbH, Krefeld, Germany

[21] Appl. No.: 325,427

[22] PCT Filed: Apr. 23, 1993

[86] PCT No.: PCT/EP93/00983

§ 371 Date: Feb. 8, 1995

§ 102(e) Date: Feb. 8, 1995

[87] PCT Pub. No.: WO93/22464

PCT Pub. Date: Nov. 11, 1993

[30] Foreign Application Priority Data

Apr. 29, 1992 [DE] Germany .............. 42 14 150.8

[51] Int. Cl.⁶ .................................................. C14C 9/02
[52] U.S. Cl. .................. 252/8.57; 8/94.1 R; 8/94.13; 8/94.14; 8/94.19 R; 8/94.2; 8/94.21; 8/94.22; 8/94.33
[58] Field of Search ............... 252/8.57; 8/94.1 R, 8/94.13, 94.14, 94.19 R, 94.2, 94.21, 94.22, 94.33; 427/384, 389

[56] References Cited

U.S. PATENT DOCUMENTS

| | | | |
|---|---|---|---|
| 2,924,588 | 2/1960 | Speier | 528/40 |
| 4,554,339 | 11/1985 | Hockemeyer et al. | 528/26 |
| 4,597,987 | 7/1986 | Hockemeyer et al. | 528/26 |
| 4,744,794 | 5/1988 | Friese et al. | 252/8.57 |
| 4,755,187 | 7/1988 | Friese et al. | 8/94.23 |
| 4,777,277 | 10/1988 | Colas et al. | 556/419 |
| 4,799,932 | 1/1989 | Friese et al. | 252/8.57 |
| 5,151,473 | 9/1992 | Herzig | 525/474 |

FOREIGN PATENT DOCUMENTS

| | | | |
|---|---|---|---|
| 3222839 | 12/1983 | Germany . | |
| 3317422 | 11/1986 | Germany | 252/8.57 |
| 3529869 | 2/1987 | Germany | 252/8.57 |

OTHER PUBLICATIONS

Luvisi et al, "Alkenyl Succinic Acid–Silicone Systems for Water Resistant Leather", The Journal of the American Leather Chemists Association, vol. LXI, No. 11, pp. 585–593, Nov. 1966.

*Silicone Chemie und Technologie* (Silicone Chemistry and Technology), Vulkan–Verlag Essen (1989), pp. 86–89 (no month).

Primary Examiner—Anthony Green
Attorney, Agent, or Firm—Evenson, McKeown, Edwards & Lenahan P.L.L.C.

[57] ABSTRACT

A process is disclosed for waterproofing materials having a fibrous structure, such as leather, persian leather or leather replacement materials, by using waterproofing agents containing sulfosuccinic acid esters. Also disclosed are waterproofing agents used to carry out this process. The sulfosuccinic acid esters are prepared by reacting maleic anhydride with monohydric or polyhydric alcohols, then by sulfitizing them. Reactive siloxanes may also be used as polyhydric alcohols.

18 Claims, No Drawings

PROCESS FOR WATERPROOFING MATERIALS HAVING A FIBROUS STRUCTURE AND AGENTS USED TO CARRY OUT THIS PROCESS

The present invention relates to the waterproofing of materials having a fibrous structure, in particular leather, fur skins, leather substitutes, by using waterproofing agents containing sulfosuccinic acid esters. The invention further relates to waterproofing agents for carrying out the process. Owing to their mild surfactant character (good dermatologic compatibility), sulfosuccinic acid esters find increasing use in shampoos, foam baths and cosmetics (personal care products) where their good emulsifying action, high foaming ability and good detergent, i.e., wetting action is selectively used in general.

The use of sulfosuccinates in the leather manufacture is described in DE-OS 16 69 347 and DE-OS 34 19 405, claiming their use as fatliquors and greases in the main fatliquoring and in tanning and retanning.

According to DE-OS 35 07 241 the emulsifying properties of sulfosuccinic acid monoesters in combination with impregnating and/or waterproofing fatliquors and greases are utilized to achieve water-repellent properties of the treated leather; a subsequent fixation with chromium and/or aluminum salts is carried out resulting in a conversion of the hydrophilic w/o-emulsifier into hydrophobic metal complex salts. The additional use of sulfosuccinic acid monoesters in the impregnating and/or waterproofing fatliquoring serves an intentional stability increase of the fatliquoring emulsion. In addition to the impregnating fatliquors and greases of the group consisting of oxidized or oxidized and partially sulfonated $C_{18-26}$-hydrocarbons or $C_{32-40}$-waxes, phosphoric acid mono-$C_{12-24}$-alkyl esters, partial esters of polycarboxylic acids, such as citric acid-$C_{16-24}$-alkyl ester, partial esters of polyalcohols, such as sorb and pentaerythritol-$C_{16-24}$-fatty acid esters, both untreated oils (neutral oils), such as long-chain hydrocarbons, chlorinated paraffin, animal and vegetable oils and fats or their methyl esters and chlorinated fatty acid methyl esters, and sulfated, sulfited, and/or synthetic fatliquors and greases based on chlorinated paraffin sulfonates may be emulsified or stabilized.

An improvement of the waterproofing action, as against the last-mentioned process, can substantially be achieved by substituting the sulfosuccinic acid monoesters for sulfosuccinic acid monoamides. However, the compulsory subsequent fixation using chromium, aluminum, titanium and/or zirconium salts is still a disadvantage of this process which is described in DE-OS 36 20 780. In practice, this fixation is mainly carried out by using chromium salts.

It is known by EP 02 13 480 that the hydrophobing of leather and furs is effected with a silicone oil and the salt of an N-($C_9$–$C_{20}$-acyl) amino acid used as emulsifier, wherein optional post-treatment with a metallic salt commonly used in tanning may follow. However, it was found that the omission of the metallic salt fixation leads to insufficient waterproofing results.

In many countries the regulations with respect to the chromium content in waste water are becoming increasingly tight. As is generally known, a considerable portion of the conventionally used chrome-tanning material is not bound by the leather fiber and for this reason comes into the waste water through washing and rinsing processes. Although this portion is lower when highly exhausting chrome tanning agents are used, it is still above the required and very low values in practice.

Additionally, a process for waterproofing leathers, fur skins and leather substitutes using a carboxyl groups-containing polysiloxane whose carboxyl groups are present in neutralized form is described in EP 03 24 345. This process is conducted in the absence of emulsifiers and without aftertreatment using mineral tanning agents.

Accordingly, it is the object of the present invention to provide substances and procedures which, when applied from the aqueous float, result in waterproof leathers, without having to conduct a subsequent treatment with mineral salts in order to avoid the above-mentioned waste water contamination.

This object is achieved by treating chrome-tanned, neutralized and washed leather with waterproofing agents comprising sulfosuccinic acid monoester and/or organosilicone monosulfosuccinate. Most surprisingly, it was found that after the acidification an additional metallic salt fixation usual so far can be omitted.

Accordingly, the subject matter of the present invention is a process for waterproofing materials having a fibrous structure, in particular leather, fur skins and leather substitutes by using waterproofing agents containing sulfosuccinic acid monoesters in aqueous float without a metallic salt fixation. An additional subject matter of the present invention are waterproofing agents for carrying out this process, which are based on sulfosuccinic acid monoesters, in particular fatliquoring and greasing waterproofing agents based on special sulfosuccinic acid monoesters, i.e., organosilicone di-(monosulfosuccinates). When organosilicone di-(monosulfosuccinates) are used as sulfosuccinic acid monoesters, they may be used alone in waterproofing. Sulfosuccinates other than organosilicone di-derivatives are combined with mineral oil, paraffin, chloroparaffin, and silicone oil as well as their mixtures and are used as waterproofing agents in this form. The organosilicone di-(monosulfosuccinates) may not only be used alone, but may also be combined in admixture with other sulfosuccinic acid monoesters and/or other substances having a water-repellent action. These waterproofing agents may be used in both a single-step method instead of the main fatliquoring and in a multistage method in the pre-fatliquoring, main fatliquoring and, optionally, top-fatliquoring.

The production of the sulfosuccinic acid monoester salts is carried out by esterification of maleic anhydride with 1 to 2 equivalents of esterification component. This step is preferably carried out such that neutral oils are already present during the esterification. Subsequently, reaction of the semi-ester is carried out with 0.5–1.5 equivalents of a sulfite or bisulfite, relative to maleic anhydride. In principle, any monohydric or polyhydric alcoholic component having one or more alkyl residues of the chain length $C_{12}$ to $C_{40}$, preferably $C_{16}$ to $C_{28}$, as well as wool wax alcohols are suitable for the esterification. They may be saturated or unsaturated, straight-chain or branched. Also, alkoxylated fatty alcohols having ethylene oxide and/or propylene oxide portions of 1–10 moles, preferably 2–5 moles per mole of fatty alcohol and fatty acid monoglycerides and diglycerides, their alkoxylated products, fatty acid polyglycol esters, having ethylene and/or propylene oxide portions as above, and the pentaerythritol and sorbitan fatty acid esters may be used. Polyols are reacted with the maleic anhydride in such stoichiometric ratios that per mole of maleic anhydride only one carboxyl group forms the ester bond.

Reactive siloxanes, e.g., α, ω-organofunctional polysiloxanes of the type

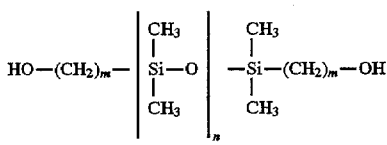

may be used as polyols.

The number of the recurring units n amounts to about 10 to about 30, and m is 1–4.

The preferred neutral oils include mineral oils, paraffins, chlorinated paraffins, and silicone oils as well as their mixtures, but also animal and/or vegetable oils and fats, such as neatsfoot oil, fish oil, tallow, palm oil, and the like.

By emulsifying the neutral oils with the claimed sulfosuccinates and their salts, respectively, a synergistic effect with respect to the water-repellent finish is achieved. An optimum action is achieved with a neutral oil content of about 25–30%, relative to the total product. When mineral oils are used, those based on paraffin have a slightly better action than those based on naphthene.

The additional use of silicone oils, e.g., dimethyl polysiloxane, diphenyl polysiloxane, supports the water-repellent properties of the leather, Also, with respect to the feel of the leather this addition is of interest.

To achieve a sufficient emulsion and storage stability hydrophobic emulsifiers may optionally be used in the sulfitation.

In principle, alkali hydroxides, ammonia or alkanolamines are suitable for the neutralization.

The invention will be illustrated in more detail by the following examples in which the usual terms are used:

A.V.=acid value

OH-number=hydroxyl number

All indications in terms of percentage mean percent by weight.

EXAMPLE 1

In a heatable 1.5-l three-neck flask provided with agitator, thermometer and dropping funnel, 127.29 g (0.338 mol) of a technical mixture of long-chain fatty alcohols $C_{18}$–$C_{26}$ (OH-number: 149) were placed first and melted at about 60° C. After complete melting, 310 g paraffinic mineral oil and 39.4 g polydimethylsiloxane (viscosity: 350 mPa.s) were added and homogenized.

Then the equivalent amount (33.15 g=0.338 mol) of maleic anhydride was added. The mixture was stirred to 75° C. for the first hour, and then at 85°–90° C. for another hour.

The reaction to the semi-ester was controlled by determination of the acid value (A.V.; 0.65–0.68 mmol/g).

The subsequent sulfitation was conducted at 85°–95° C. with a 25% sulfite solution (48.29 g sodium disulfite, 0.254 mol, corresponding to 150% of theory, in 144.9 g water). The addition was effected such that the temperature did not fall below 80° C. The total sulfitation was completed after 3–4 hours.

By adding 50% sodium hydroxide solution and purified water having a temperature of 60° C., the product is adjusted to a pH of 6.5–7.5 and a water content of approximately 42%.

EXAMPLE 2

In correspondence to Example 1, 101.68 g (0.27 mol) of the fatty alcohol mixture were reacted in 247.7 g paraffinic mineral oil and 31.2 g polydimethylsiloxane (viscosity: 350 mPa.s) with 26.49 g (0.27 mol) maleic anhydride.

Prior to sulfitation, 23.0 g sulfosuccinic acid monoester based on the fatty alcohol used in Example 1 and reacted with an average of 3 moles of ethylene oxide were added in the form of a 50% aqueous standardization. The subsequent reaction to the sulfosuccinic acid ester with a 25% sulfite solution (23.1 g sodium disulfite, 0.12 mol, corresponding to 90% of theory, in 69.3 g water) was conducted as in Example 1.

By adding monoethanolamine and purified water of a temperature of 60° C., the product is adjusted to a pH of 6.5–7.5 and a water content of about 50%.

EXAMPLE 3

As in Example 1, 124.28 g (0.33 mol) of a fatty alcohol mixture were reacted in 255.15 g paraffinic mineral oil with 32.27 g (0.33 mol) maleic anhydride.

Prior to sulfitation, 51.0 g of a fatty alcohol $C_{12}$–$C_{18}$ were added. The sulfitation was conducted under the same outward conditions as in Example 1, however, with a 25% sulfite solution (31.37 g sodium disulfite, 0.165 mol, 100% of theory, in 94.1 g water) which had been adjusted to pH 7 with ammonia liquor.

By adding purified water of 60° C., the product is adjusted to a water content of approximately 50%.

EXAMPLE 4

According to Example 1, 127.29 g (0.338 mol) of the fatty alcohol mixture were reacted in 320 g paraffinic mineral oil and 39.4 g polydimethylsiloxane (viscosity: 350 mPa.s) with 33.15 g (0.338 mol) maleic anhydride.

Afterwards 10 g of the reaction product of oleyl amine and acrylic acid as well as maleic anhydride according to DP-application 36 36 497 neutralized with sodium hydroxide solution were added as coemulsifier in the form of a 25% aqueous emulsion, followed by sulfitation corresponding to Example 1 with a 25% sulfite solution (48.29 g sodium disulfite, 0.254 mol, 150% of theory, in 144.9 g water).

By adding sodium hydroxide solution and water, the product is adjusted to a pH of 6.5–7.5 and a water content of about 39%.

EXAMPLE 5

According to Example 1, 121.87 g (0.467 mol) of a tallow fatty alcohol (OH-number: 215) were reacted in 251.5 g of a paraffinic mineral oil with 45.81 g (0.467 mol) maleic anhydride.

The sulfitation with a 25% sulfite solution (44.3 g sodium disulfite, 0.233 mol, 100% of theory, in 132.9 g water) was effected as in Example 1.

By adding monoethanolamine and water, the product is adjusted to a pH of 7.0–7.5 and a water content of about 50%.

EXAMPLE 6

As in Example 1, 96.72 g (0.412 mol) of an ethoxylated tallow fatty alcohol having an average of 3 moles of ethylene oxide were reacted in 279 g of a paraffinic mineral oil with 40.41 g (0.412 mol) maleic anhydride.

The sulfitation according to Example 1 was carried out with a 25% sulfite solution (39.16 g sodium disulfite, 0.206 mol, 100% of theory, in 117.5 g water).

By adding monoethanolamine and water, the product is adjusted to a pH of 7.0–7.5 and a water content of approximately 50%.

EXAMPLE 7

In accordance with Example 1, 142.42 g (0.33 mol) of the same fatty alcohol mixture, however, reacted with an average of 3 moles of ethylene oxide (OH-number: 130), were reacted in 262 g paraffinic mineral oil with 32.37 g (0.33 mol) maleic anhydride. The sulfitation as in Example 1 was effected with a 25% sulfite solution (31.37 g sodium disulfite, 0.165 mol, 100% of theory, in 94.1 g water).

By adding monoethanolamine and water, the product is adjusted to a pH of 7.0–7.5 and a water content of approximately 50%.

EXAMPLE 8

In an apparatus as in Example 1, 349.13 g (0.14 mol) of α, ω-hydroxy-organofunctional polydimethylsiloxane (approximately 30 dimethylsiloxane units, OH-number: approximately 45) were reacted with 27.47 g (0.28 mol) maleic anhydride in correspondence with Example 1.

As coemulsifier, 100 g of the reaction product according to DP-application 36 36 497 (cf. example 4) neutralized and sodium hydroxide solution were added in the form of a 25% aqueous emulsion.

The sulfitation as in Example 1 was effected with a 25% sulfite solution (26.62 g sodium disulfite, 0.14. mol, 100% of theory, in 79.9 g water).

By adding sodium hydroxide solution and water, the product is adjusted to a pH of 8.0 to 8.5 and a water, content of about 45%.

Application Example 1

The products according to Examples 1–8 were tested with split cattle hide as follows:
Material: fully chrome-tanned split cattle hide
Shaved substance: 1.3–1.4 mm %-indications relative to shaved weight.

| NEUTRALIZATION: drain off bath | 300% water 35° C. | | |
|---|---|---|---|
| | 150% water 35° C. | | |
| | 1% sodium formate undiss. | | 10 min |
| | 1% sodium bicarbonate 1:10 pH: appr. 6 | | 60 min |
| drain off bath WASHING: drain off bath | 300% water 55° C. | | 10 min |
| WATERPROOFING: | 150% water 55° C. | | |
| | 7.5% eff. subst. of product acc. to invention 1:4/60° C. | | 60 min |
| | 1% formic acid 1:5 pH: appr. 4.2 | | 20 min |
| rinsing: horse up overnight, hang up to dry, moisten, staking. | water 25° C. | | 10 min. |

| Examination in the Bally-Penetrometer | | | | | | | | |
|---|---|---|---|---|---|---|---|---|
| Example | 1 | 2 | 3 | 4 | 5 | 6 | 7 | 8 |
| Water penetration at 10% amplitude in min. | >420 | 185 | 125 | >420 | 62 | 50 | 103 | >420 |
| Water absorption | 17% after 7 h | 28% after 4 h | 25% after 3 h | 11% after 7 h | 26% after 1 h | 36% after 2 h | 32% after 2 h | 11% after 7 h |

Application Example 2

Waterproof glove nappa-natural
Material: Chrome-tanned hair sheep, sammed %-indications relative to sammed weight.

| WASHING: drain off bath | 300% water 35° C. | 15 min |
|---|---|---|
| NEUTRALIZATION: | 100% water 35° C. | |
| | 1% sodium bicarbonate 1:10 pH: 6 | 30 min |
| drain off bath WASHING: drain off bath | 300% water 60° C. | 10 min |
| WATERPROOFING: | 100% water 60° C./ | |
| | 20% product acc. to Example 1 1:4/60° C. | 60 min |
| | +1.0% formic acid 1:10 | 2 × a 15 min +20 min |
| | pH: appr. 3.5 | |
| rinsing: leather horse up overnight, vacuum drying at 60° C./3 min., drying in suspended condition, moisten, staking, milling. | water 25° C. | 10 min |

Application Example 3

Material: dyed lambskin suede
Float ratio 1:10, relative to dry weight
Subsequent to the dyeing of the fur leather:

| rinsing: | | water 45° C. | 10 min |
|---|---|---|---|
| WATERPROOFING: | | water 45° C. | |
| | 0.3 g/l | ammonia 1:5 | 5 min |
| | +8–10 g/l | product acc. to Example 1 1:4/ 60° C. | 90 min |
| | +0.7 ml/l | formic acid 1:5 pH of float: appr. 4 | 30 min |
| wash: | | water 25° C. | |
| horse up overnight, centrifuging, wet toggling, moisten, staking, carding, shearing ironing. | 0.2 ml/l | formic acid 1:5 | 10 min |

Soft and fluffy sueded shearlings are obtained having a pronounced shower proofness.

We claim:

1. A process of waterproofing a material having a fibrous structure selected from the group consisting of leather and fur, said process comprising the step of waterproofing said material by treating said material in an aqueous float with a waterproofing agent without conducting a mineral salt fixation, said waterproofing agent comprising:
   i) an organosilicon di-(monosulfosuccinate) or salt thereof, or
   ii) a sulfosuccinic acid monoester or salt thereof and at least one oil selected from mineral oil, paraffins, chlorinated paraffins or silicone oils.

2. A process according to claim 1, wherein said waterproofing agent consists of an organosilicon di-(monosulfosuccinate).

3. A process according to claim 1, wherein said waterproofing agent comprises a sulfosuccinic acid monoester and at least one oil selected from mineral oil, paraffins, chlorinated paraffins or silicone oils.

4. A process according to claim 1, wherein said waterproofing agent further comprises a neutral oil selected from mineral oil, paraffins, chlorinated paraffins, silicone oils, animal and vegetable fats and oils, or mixtures thereof.

5. A process according to claim 1, wherein said treating consists of a single stage treatment carried out in a main fatliquoring stage.

6. A process according to claim 1, wherein said treating consists of a multi-stage treatment carried out in a pre-fatliquoring stage, a main fatliquoring stage and a top fatliquoring stage.

7. A process according to claim 1, wherein said waterproofing agent is formed by esterifying maleic anhydride with an alcoholic component to produce a maleic acid ester and subsequently sulfiting the maleic acid ester.

8. A process according to claim 7, wherein the maleic anhydride is reacted with one or two equivalents of the alcoholic component.

9. A process according to claim 7, wherein said sulfiting is carried out in the presence of a coemulsified.

10. A process according to claim 7, wherein said sulfiting is carried out by reacting the maleic acid ester with from 0.5 to 1.5 equivalents of a sulfite or bisulfite.

11. A process according to claim 1, wherein said waterproofing agent is formed by sulfiting a monoester of maleic acid with a monohydric or polyhydric alcohol containing a 12 to 40 carbon atom alkyl residue.

12. A process according to claim 11, wherein said alcohol contains a 16 to 28 carbon atom alkyl residue.

13. A process according to claim 1, wherein said waterproofing agent is formed by sulfiting a monoester of maleic acid with wool wax alcohols.

14. A process according to claim 1, wherein said waterproofing agent is formed by sulfiting a monoester of maleic acid with a fatty alcohol alkoxylated with from 1 to 10 moles of ethylene oxide or propylene oxide per mole of fatty alcohol.

15. A process according to claim 14, wherein said fatty alcohol is alkoxylated with from 2 to 5 moles of ethylene oxide or propylene oxide per mole of fatty alcohol.

16. A process according to claim 1, wherein said salt is an alkali, alkaline earth, ammonium, or alkanolamine salt of a sulfosuccinate monoester.

17. A process of waterproofing a material having a fibrous structure selected from the group consisting of leather and fur, said process comprising the step of waterproofing said material by treating said material in an aqueous float with a waterproofing agent comprising an organosilicon di-(monosulfosuccinate) without conducting a mineral salt fixation.

18. Novel sulfosuccinic acid monoesters made by reaction of α, ω-organofunctional polysiloxanes of the formula

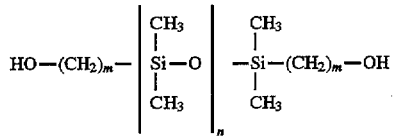

wherein n is a number from 10 to 30 and m is 1 to 4, with maleic anhydride and subsequent sulfitation.

* * * * *